Patented Nov. 28, 1939

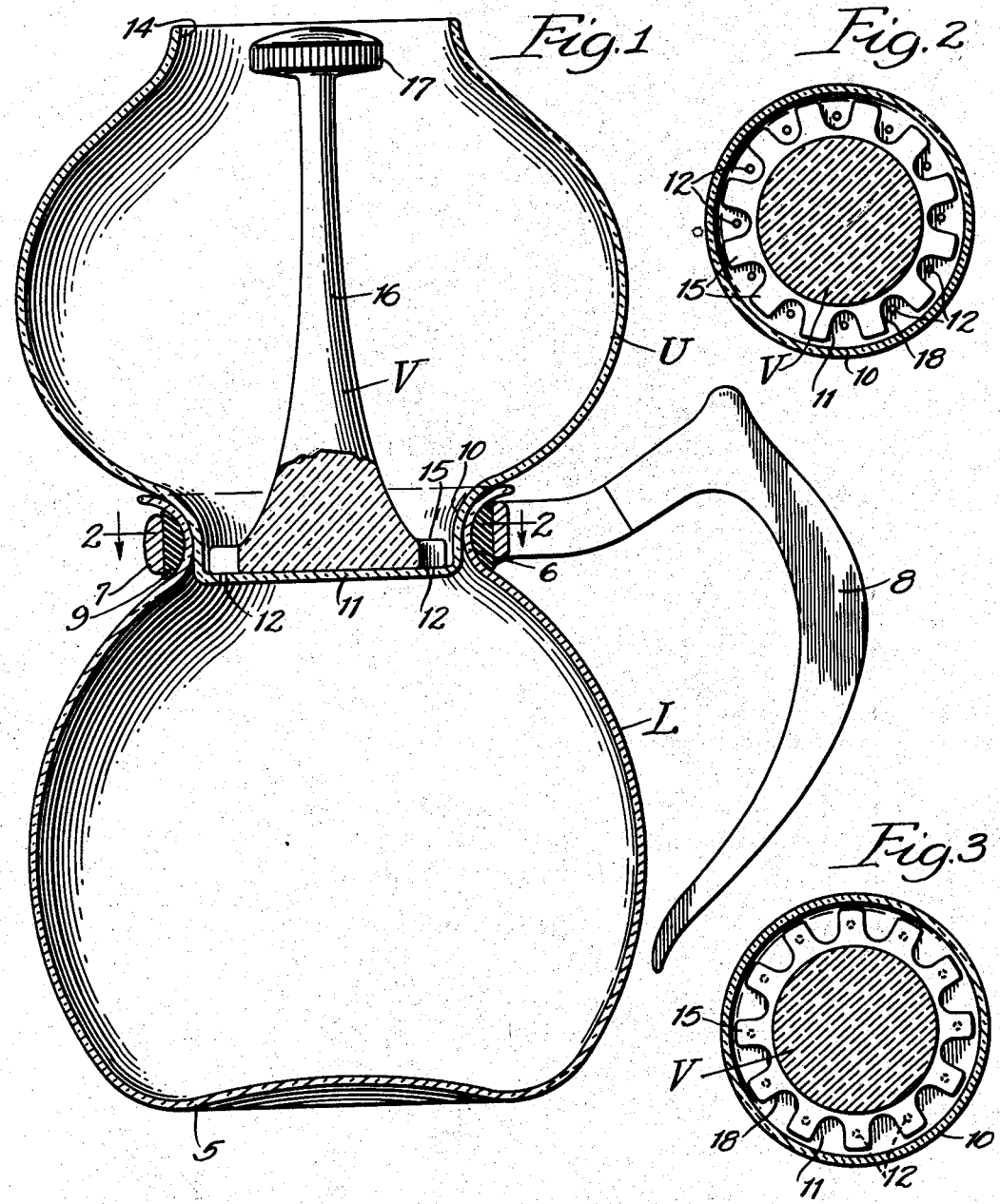

2,181,578

UNITED STATES PATENT OFFICE 2,181,578

COFFEE BREWER

Harvey Cory, Chicago, Ill.

Application April 7, 1938, Serial No. 200,714

1 Claim. (Cl. 53—3)

This invention relates generally to a coffee brewing utensil in which is comprised upper and lower vessels, the former being adapted to seat in the mouth of the latter; there being also a strainer with an associated valve by which to control the drip of coffee infusion from the upper into the lower vessel.

More particularly, the present improvements are concerned with a utensil of the type mentioned in which the vessels may be formed of glass, or other ceramic material, by machine production, the mouth of each vessel being wide to permit cleaning of its interior and also to facilitate insertion thereinto or removal therefrom of a valve unit which is loosely fitted into the upper vessel. In the present utensil it is unnecessary to use any rubber or other material to produce a seal between the two interfitting vessels; it is preferred, in fact, that there be a slight breathing space therebetween to permit the escape of air from the lower vessel when the coffee infusion is received thereinto.

The lower vessel may be formed with a wide base so as to remain upright during all normal conditions of use; the base of the upper vessel may also be relatively wide since it is formed to interfit with the wide mouth of the lower vessel, and in consequence will afford a substantial support by which to maintain the upper vessel upright when it is stood separately upon a table or elsewhere. In the respects noted, as well as in the directions of simplicity, low cost of manufacture, ease of handling, etc., the present utensil is advantageous, all as will be more fully pointed out hereinafter.

An exemplification of my invention is set forth in the accompanying drawing, wherein—

Figure 1 is a central vertical section through the coffee utensil in its entirety;

Fig. 2 is a transverse section taken on line 2—2 of Fig. 1; and

Fig. 3, which is a view similar to Fig. 2, shows the valve unit rotated to a closure position.

The coffee brewer illustrated comprises a lower bowl-shaped vessel, preferably of glass or other ceramic material, having a bottom formed to provide a relatively flat base 5 by which the utensil may be sustained normally in an upright position. The walls of this vessel, as shown, are bowed outwardly, and then near its upper end are constricted inwardly to provide a neck 6 around which may be fitted a collar 7 to which is connected a handle 8 by which the utensil may be easily lifted or moved about. A resilient gasket 9 may be interposed between the collar and neck in accordance with usual practice. Beyond the neck the vessel extends upwardly and outwardly a slight distance to form a flaring mouth which is of relatively wide diameter.

As part of the present utensil I also provide an upper bowl-shaped vessel U, preferably of glass or other ceramic material, having its bottom formed into a depending well 10 which follows generally the size and shape of the mouth of the lower vessel. The well bottom 11 which is flat is provided with a series of small openings 12 therethrough arranged according to a definite plan, as, for example, equidistantly around a circle which is relatively close to the outer periphery of the well. The size and shape of the upper vessel is such as to provide a bowl of ample capacity with its upper end inwardly extended, by preference, to form an open mouth 14 of wide diameter.

The remaining unit of the present utensil is a valve V having a disk-like base 15 adapted to be loosely seated within the well of the upper vessel, there being a handle or stem 16 upstood from the base to terminate in an operating head or knob 17 at its upper end which is located at or near the open mouth of the vessel. As best shown in Figs. 2 and 3, the disk-like base is formed with peripheral notches 18 extending inwardly a distance sufficient to uncover the well openings 12 when the valve unit is in one rotative position, as, for example, that which is shown in Fig. 2. In another rotative position, as in Fig. 3, the valve disk provides a closure for all these openings, so that coffee infusion within the upper vessel is not permitted to drip into the vessel therebelow.

It will be noted that, by reason of the wide-mouthed character of the lower vessel, the upper vessel may be provided with a depending well forming a base of substantial size therefor, this well being adapted to seat concentrically but loosely within the mouth of the lower vessel whereby to maintain a secure superposed relation therewith. In this condition the two vessels may be handled safely as a unit. The valve unit, being made of one piece of material such as glass or other ceramic material, may be produced cheaply and requires little or no attention in use. The head of the valve stem is extended upwardly beyond the level of liquid infusion which is normally contained within the upper vessel so as to be conveniently available for operation—a procedure which is facilitated by the wide-mouthed character of this vessel. By proper manipulation the valve unit may be disposed rotatively so as to cover or uncover to any extent desired the several drip openings through the bottom of the upper vessel, these openings being so sized, in relation to the grounds of the coffee used, so as to effectively prevent their escape therethrough during the drip operation by which the infusion is transferred from the upper to the lower vessel. No ground surfaces, either on the valve disk or the well bottom, need be provided since any slight leakage at this point would be entirely inconsequential. It will be apparent, of course, that with the valve unit removed and the upper vessel taken off of the lower vessel, the cleaning of the grounds therefrom and from the openings in its bottom, may be very readily performed.

I claim:

In a drip coffee utensil, the combination of two wide-mouthed bowls one of which is formed at its bottom to seat within the mouth of the other when in superposed relation thereto, and a valve unit comprising an outwardly flaring base loosely seated upon the bottom of the upper bowl and adapted to rotate concentrically therewithin, said unit having an upwardly tapering operating handle extending unsupported within the upper bowl to a point close to the wide mouth thereof for convenient manipulation, the bottom of the upper bowl and the periphery of the valve base being each formed with an annular series of apertures therethrough adapted when the valve unit is in different rotative positions to open or close the apertures to the interior of the lower bowl, the base of said valve and bottom of said upper bowl cooperating adjacent the periphery of said base to support a quantity of ground coffee relative to the apertures in said base, whereby drip of coffee infusion into the lower bowl may be controlled.

HARVEY CORY.